United States Patent
Sahashi (10) Patent No.: US 8,727,434 B2
(45) Date of Patent: May 20, 2014

(54) VEHICLE SEAT

(75) Inventor: Hideo Sahashi, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 76 days.

(21) Appl. No.: 13/440,202

(22) Filed: Apr. 5, 2012

(65) Prior Publication Data

US 2012/0256451 A1  Oct. 11, 2012

(30) Foreign Application Priority Data

Apr. 7, 2011 (JP) ................................. 2011-085309
Apr. 20, 2011 (JP) ................................. 2011-094013

(51) Int. Cl.
*B60N 2/56* (2006.01)

(52) U.S. Cl.
USPC ................................. 297/180.14; 297/180.13

(58) Field of Classification Search
USPC .............................. 297/180.13, 180.14, 180.1
See application file for complete search history.

(56) References Cited

U.S. PATENT DOCUMENTS

| 6,578,910 B2* | 6/2003 | Andersson et al. ...... 297/180.11 |
| 6,848,742 B1 | 2/2005 | Aoki et al. |
| 2006/0138811 A1* | 6/2006 | Pfahler et al. ............ 297/180.14 |
| 2011/0133525 A1 | 6/2011 | Oota |

FOREIGN PATENT DOCUMENTS

| CN | 1492816 | 4/2004 |
| JP | 2000-70071 | 3/2000 |

OTHER PUBLICATIONS

U.S. Appl. No. 13/440,181 to Hideo Sahashi, filed Apr. 5, 2012.
U.S. Appl. No. 13/448,664 to Hideo Sahashi, filed Apr. 17, 2012.
Chinese Office Action from the State Intellectual Property Office (SIPO) of the People's Republic of China in Chinese Application No. 201210099861.0, dated Jan. 14, 2014, together with an English language translation thereof.

* cited by examiner

*Primary Examiner* — Milton Nelson, Jr.
(74) *Attorney, Agent, or Firm* — Greenblum & Bernstein, P.L.C.

(57) ABSTRACT

A seat component has a center portion that contacts the body or legs of a seated occupant, and side portions that contacts neither the body nor legs of the seated occupant. A flow passage has a center vent formed in the center portion, a side vent formed in the side portions, and communication portions that provide communication between the center vent and the side vent within the seat component. The air blown out of a blower is supplied to a seating-face of the seat component from at least one of the center vent and the side vent.

5 Claims, 8 Drawing Sheets

FIG. 8

VEHICLE SEAT

INCORPORATION BY REFERENCE

The disclosure of Japanese Patent Application No. 2011-094013 filed on Apr. 20, 2011 including the specification, drawings and abstract is incorporated herein by reference in its entirety.

BACKGROUND OF THE INVENTION

1. Field of the Invention

The invention relates to a vehicle seat with a built-in blower.

2. Description of Related Art

A vehicle seat of the aforementioned type is described in Japanese Patent Application Publication No. 2000-70071 (JP 2000-70071 A). The vehicle seat includes a seat cushion, a seatback, and a blower. The blower includes a centrifugal blower mechanism that blows air in the centrifugal direction while sucking in external air from the axial direction of the blower. The seatback has a cushion member that defines the outer shape of the seatback, and fabric upholstery. A flow passage is formed in the cushion member.

The flow passage is formed of grooves and an introducing passage. The grooves are recesses formed in a seating-side portion of the cushion member, and arranged in a branched structure. The introducing passage is formed inside the cushion member, and provides communication between the blower and the grooves. According to the conventional technique, the blower is provided inside the seatback and the seating-side portion of the cushion member is covered with a cover. The cover is a porous flat member having appropriate air permeability. Then, the cushion member and the blower are covered with the upholstery. After that, the air blown out of the blower is supplied to an occupant through the flow passage (introducing passage, grooves) of the cushion member and the cover.

In the vehicle seat of this type, it is desirable that the amount of air supplied from the center of the seatback and the amount of air supplied from the side portions of the seatback be adjusted appropriately based on the manner in which the occupant is seated in the vehicle seat. For example, when the occupant is seated in the vehicle seat without contacting the seatback, preferably, the air is supplied to the occupant mainly from the center of the seatback. On the other hand, when the occupant is leaning against the seatback, that is, when the occupant's body is in contact with the center of the seatback, preferably, the air is supplied to the occupant from the side portions of the seatback, for example, from the portions of the seatback on the sides of the lower back of the occupant. However, according to the conventional technique, the air that passes through the grooves is uniformly blown out of the porous cover. Therefore, the configuration according to the conventional technique is unsuitable for causing a difference between the amount of air supplied from the center of the seatback and the amount of air supplied from the side portions of the seatback. In other words, there is still room for improvement in the efficiency in supplying the air to the occupant.

SUMMARY OF THE INVENTION

The invention makes it possible to supply air to an occupant appropriately based on the manner in which the occupant is seated in a vehicle seat.

An aspect of the invention relates to a vehicle seat that includes a seat component and a blower. The seat component includes a cushion member that forms the outer shape of the seat component. The blower is provided in the seat component. In the vehicle seat according to the aspect of the invention, the air blown out of the blower is supplied to a seating-face through a flow passage formed in the cushion member. In the thus configured vehicle seat, it is desirable that the air be supplied to an occupant appropriately based on the manner in which the occupant is seated in the vehicle seat.

Therefore, according to the aspect of the invention, the aforementioned seat component has a center portion that contacts the body (shoulders, back, lower back, or buttocks) or legs of the seated occupant, and side portions that contact neither the body nor legs of the seated occupant. Further, the flow passage has a center vent formed in the center portion, a side vent formed in at least one of the side portions, and communication portions that provide communication between the center vent and the side vent within the seat component. The air blown out of the blower is supplied through the communication portions to the occupant from at least one of the center vent and the side vent. According to the aspect of the invention, when the occupant is not in contact with the center portion, the air is supplied to the occupant from both the center vent and the side vent. On the other hand when the center vent is closed due to contact of the occupant with the center portion, the air is supplied to the occupant from the side vent. In other words, the amount of air supplied to the occupant is adjusted appropriately. According to the aspect of the invention, it is possible to supply the air to the occupant appropriately based on the manner in which the occupant is seated in the vehicle seat.

In the aspect of the invention described above, when the occupant is not in contact with center portion, the amount of air supplied to the occupant from the center vent may be larger than the amount of air supplied to the occupant from the side vent.

Thus, it is possible to more appropriately supply the air to the occupant.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereafter, embodiments of the invention will be described with reference to FIGS. 1 to 8. In the drawings, the reference characters F, B, UP, and DW denote the front side, rear side, upper side, and lower side of a vehicle seat, respectively. A vehicle seat 2 shown in FIG. 1 has seat components including a seat cushion 4, a seatback 6, and a headrest 8, and rail members 9. These seat components 4, 6, 8 include frames 4F, 6F, 8F, each constituting a seat framework, cushion members 4P, 6P, 8P, each defining a seat outer shape, and upholsteries 4S, 6S, 8S, with which the corresponding cushion member is covered, respectively.

Figure 1:
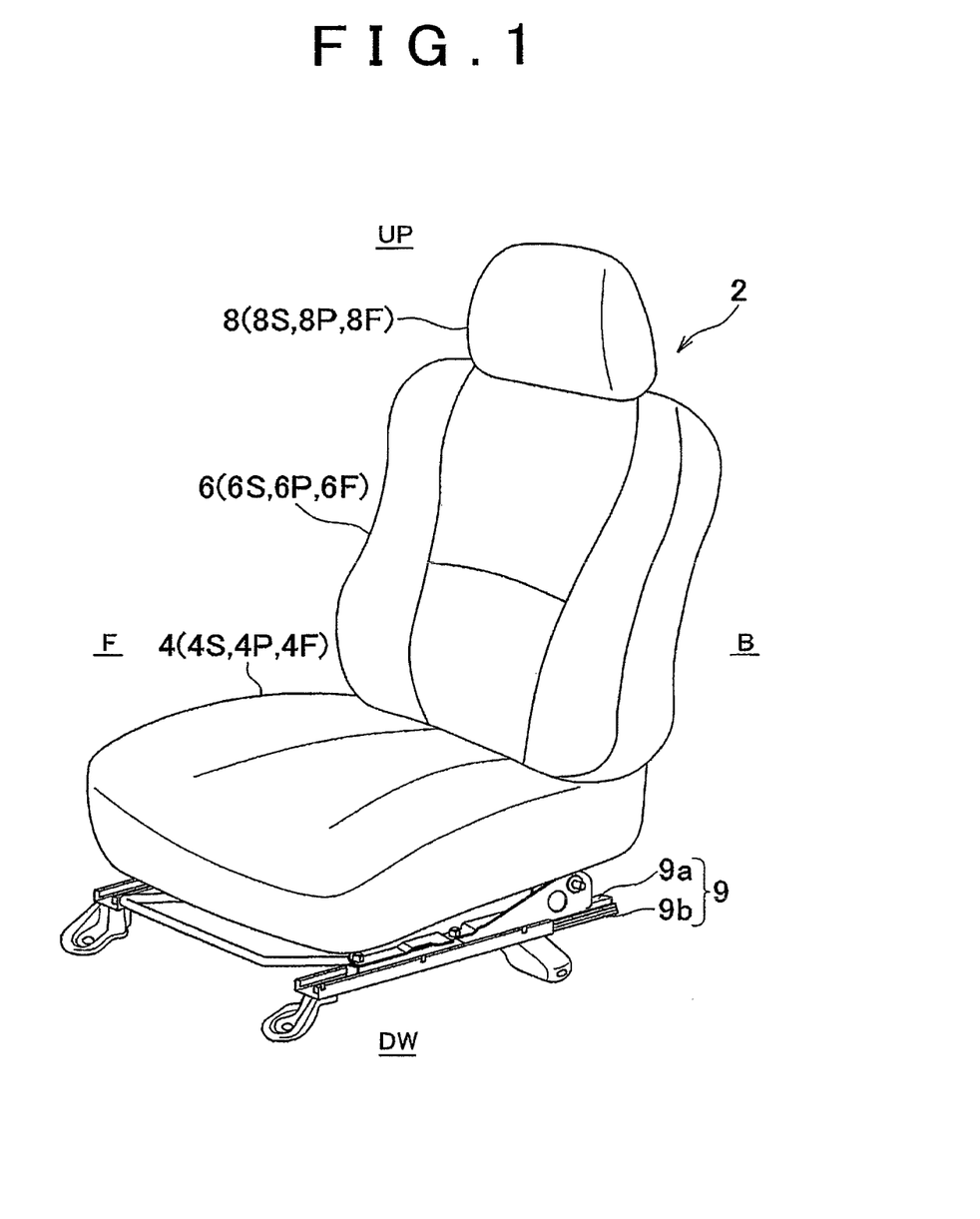
FIG. 1 is a perspective view of a vehicle seat according to embodiments of the invention.

Each rail member 9 has an upper rail 9a, and a lower rail 9b to which the upper rail 9a is slidably fitted. The seat cushion 4 is attached to the upper rails 9a. As a result, the vehicle seat 2 is slidable along the lower rails 9b. The headrest 8 is provided at an upper portion of the seatback 6, and has a pair of stays (not shown in the drawings). The stays are inserted into tubes (not shown in the drawings) of the seatback 6. In this way, the headrest 8 is attached to the upper portion of the seatback 6 via the stays.

A first embodiment of the invention will be described below. The seat cushion 4 has S-shaped springs 14 (see FIG. 7). Each S-shaped spring 14 is a wire rod bent into a substantially S-shape. In the first embodiment, multiple S-shaped springs 14 are provided on the rear face of the seat cushion 4 and attached to the frame 4F. The seatback 6 is tiltably coupled to the seat cushion 4, and has a center portion 16a, side portions 16b, and a blower 40 (see FIGS. 1 to 6). As shown in FIG. 4, the center portion 16a contacts the body (shoulders, back, and lower back) of a seated occupant, and is formed at the center of the seatback 6 (see the portion defined by two-dot chain lines CR in FIG. 4). The side portions 16b do not contact the body of the seated occupant, and are formed on the sides of the center portion 16a. The side portions 16b in the first embodiment are formed at the lower portions on the sides of the center portion 16a, that is, formed on the sides of the lower back of the occupant.

Figures 3A, 3B:
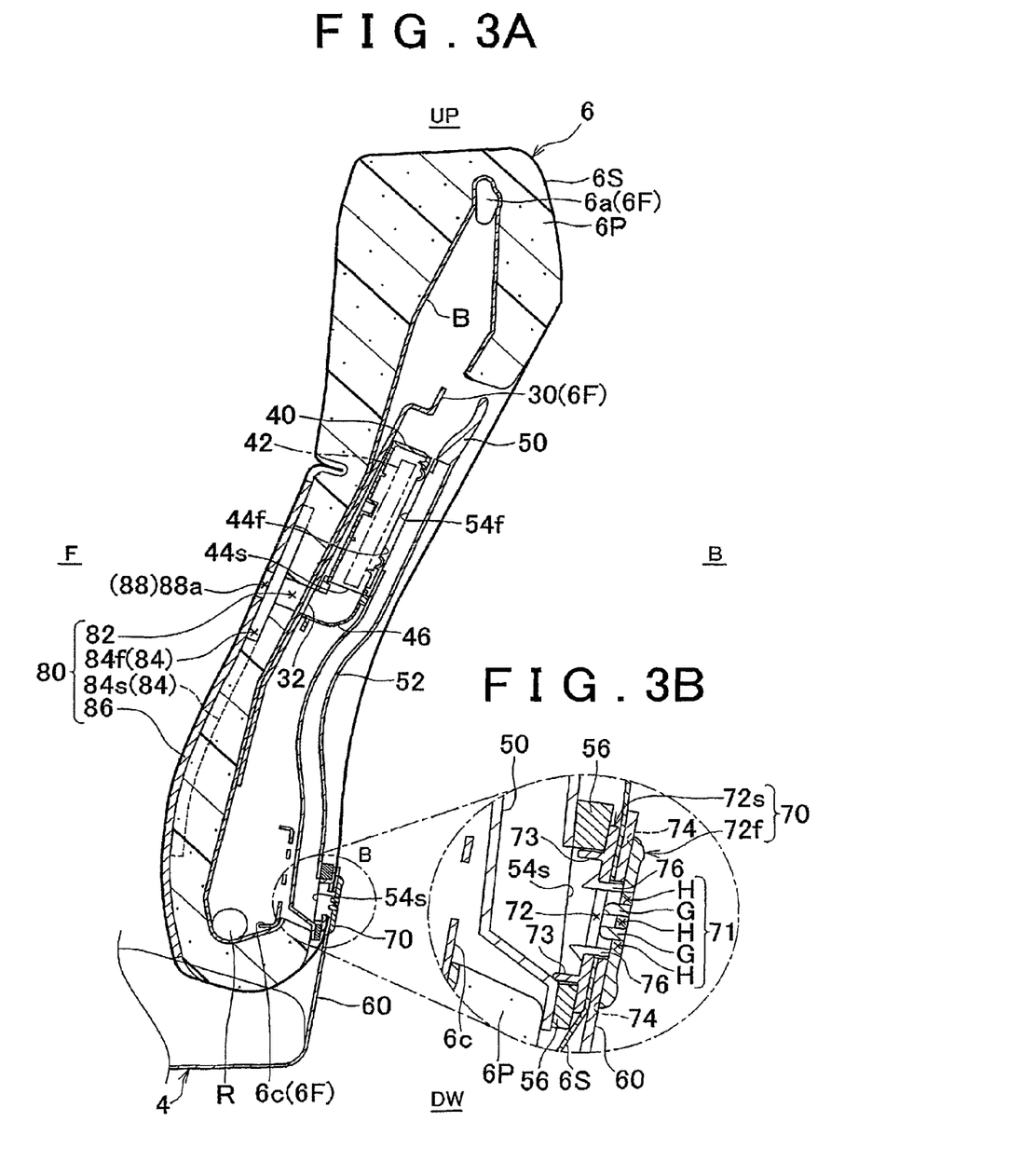
FIG. 3A is a vertical sectional view of the seatback of the vehicle seat.
FIG. 3B is a partial enlarged view of a configuration shown in FIG. 3A.
Figure 4:
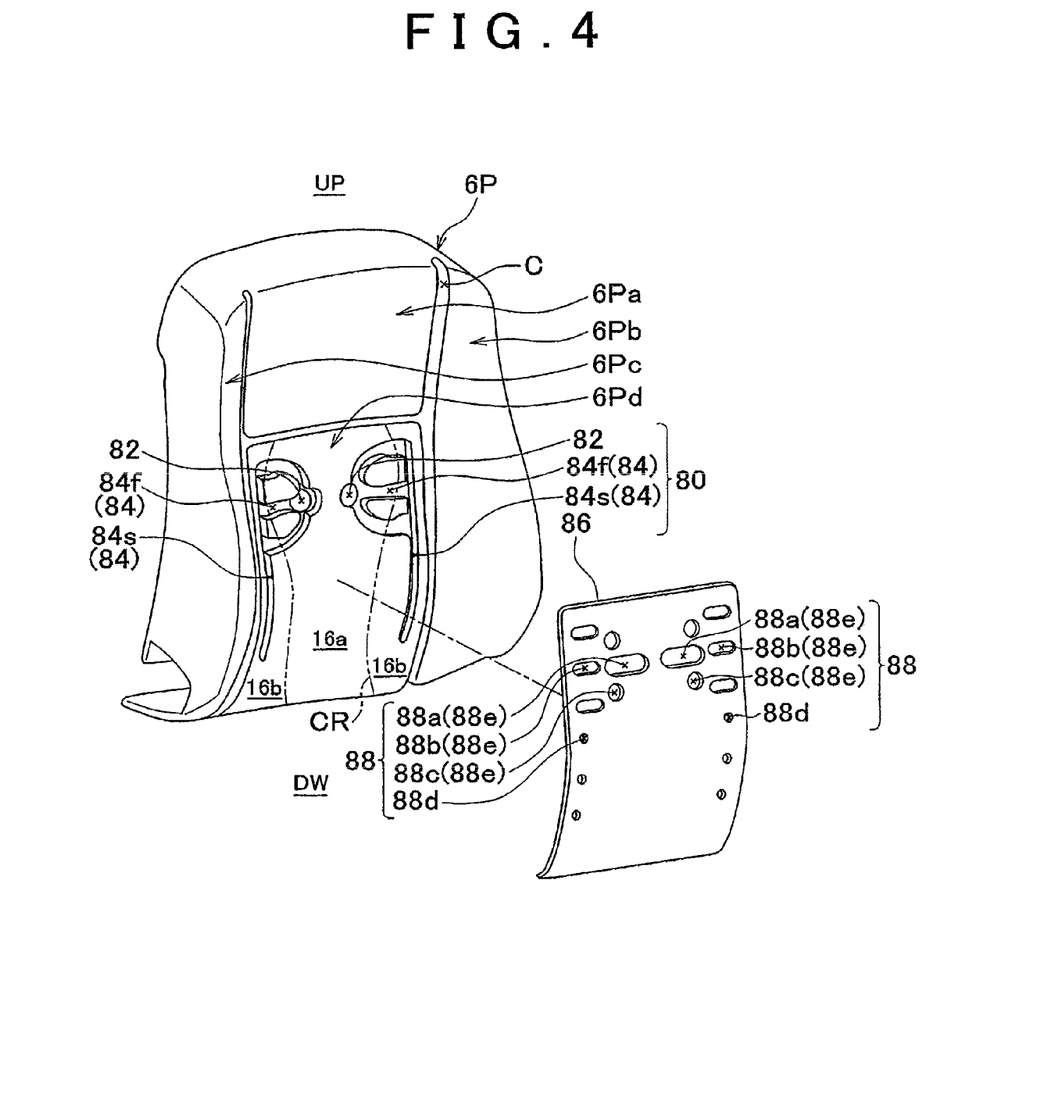
FIG. 4 is an exploded perspective view of a cushion member and a cover according to a first embodiment of the vehicle seat.

In the first embodiment, the external air is supplied to the blower 40 arranged inside the seatback 6, and the air blown out of the blower 40 is supplied to the occupant (see FIG. 3). In the thus configured vehicle seat 2, it is desirable that the air be appropriately supplied to the occupant based on the manner in which the occupant is seated in the vehicle seat 2. For example, when the occupant is seated in the vehicle seat 2 without contacting the seatback 6, preferably, the air is supplied to the occupant mainly from the center portion 16a (see FIG. 4). On the other hand, when the occupant is leaning against the seatback 6, that is, when the occupant's body contacts the center portion 16a, preferably, the air is supplied to the occupant mainly from the side portions 16b. Therefore, with the following configuration according to the first embodiment; the air is supplied to the occupant appropriately based on the manner in which the occupant is seated in the vehicle seat 2.

The seatback 6 has the basic seat components 6F, 6S, 6P, the blower 40, a duct 50, a lower band 60, a supply portion 70, and a flow passage 80 (see FIGS. 2 to 6). The blower 40 is provided at the frame 6F, the cushion member 6P is placed on the frame 6F, and then the frame 6F and the cushion member 6P are covered with the upholstery 6S (see FIGS. 2 and 3). While the external air is supplied from the supply portion 70 attached to the lower band 60 to the blower 40 through the duct 50, the air blown out of the blower 40 is supplied to the occupant through the flow passage 80.

Figure 2:
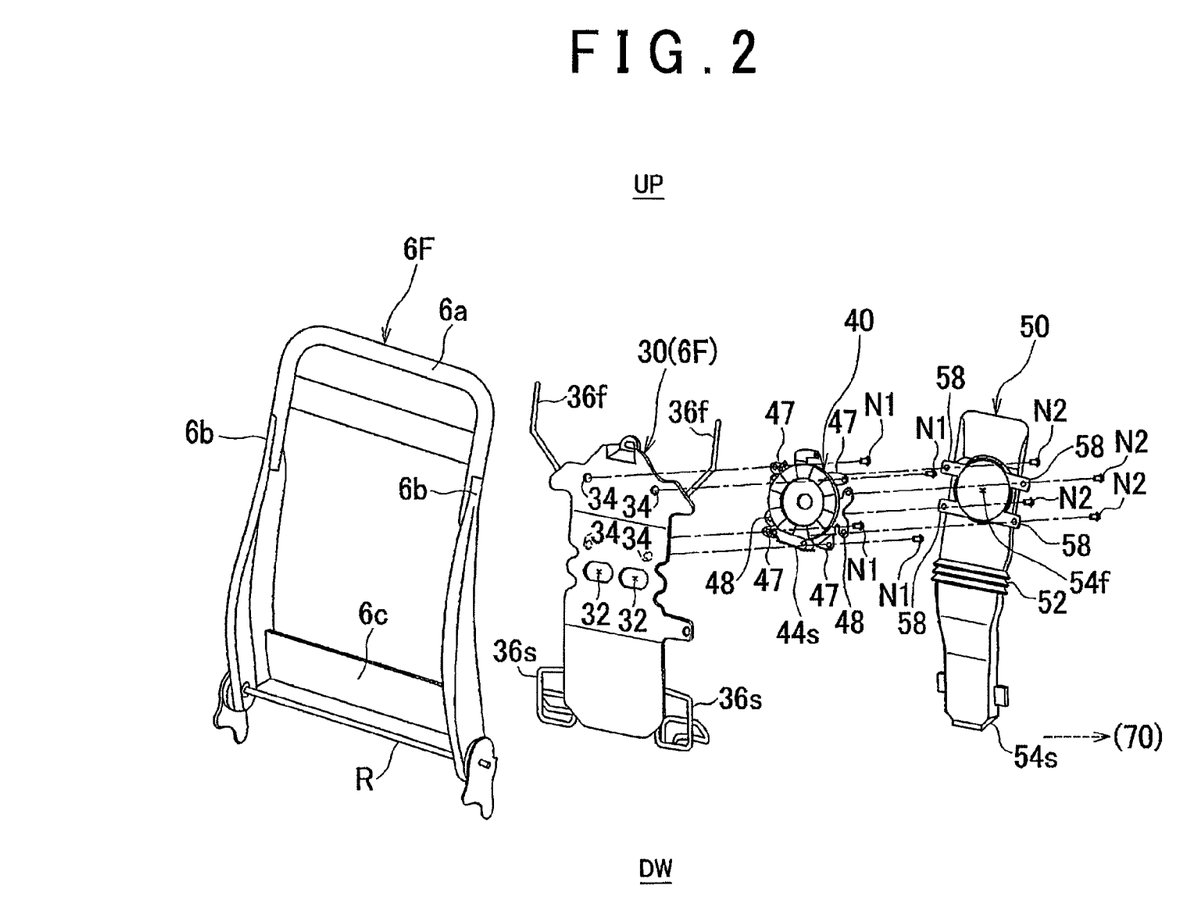
FIG. 2 is an exploded perspective view of part of a seatback of the vehicle seat.

The frame 6F is an arched frame, and has an upper frame 6a, a pair of side frames 6b, a lower frame 6c, a reclining shaft R, and a support bracket 30 (see FIG. 2). The upper frame 6a constitutes an upper portion of the seatback 6, and has a substantially inverted U-shape in the front view. The lower frame 6c is a flat plate that is extended between the side frames 6b at the lower portion of the seatback 6. The side frames 6b are flat plates that form respective side parts of the seatback 6, and are attached to the lower ends of the upper frame 6a. The reclining shaft R is attached to the lower end portions of the side frames 6b, and extended between the lower end portions of the side frames 6b. The reclining shaft R serves as pivot axis used to adjust the reclining angle of the seatback 6 with respect to the seat cushion 4 (see FIG. 1).

The support bracket 30 is a substantially rectangular flat plate having a pair of communication holes 32; attachment portions 34, a pair of first wires 36f, and a pair of second wires 36s (see FIG. 2). The communication holes 32 are through-holes that communicate with the blower 40, and are formed at the center of the support bracket 30. The attachment portions 34 are holes into which screws N1 are inserted, and formed above the communication holes 32. The attachment portions 34 may be either through-holes or blind holes.

Each first wire 36f has a substantially L-shape. The first wires 36f are attached to respective ends of the upper portion of the support bracket 30, and extend toward the top of the seatback 6. The second wires 36s are bent so as to hold the lower frame 6c, and have a substantially inverted Y-shape in the side view. The second wires 36s are attached to respective ends of the lower portion of the support bracket 30 and extend toward the bottom of the seatback 6. In the first embodiment, the support bracket 30 is disposed in the frame 6F, the first wires 36f are attached to the upper frame 6a, and the second wires 36s are attached to the lower frame 6c. The blower 40, described below in detail, is attached to an upper portion of the support bracket 30, that is, a portion of the support bracket 30 above the communication holes 32.

The blower 40 is a hollow case member having a short cylinder shape. The blower 40 has a blower mechanism 42, a first opening 44f, a second opening 44s, a tube 46, base attachment portions 47, and first attachment portions 48 (see FIGS. 2 and 3). The tube 46 is typically in an accordion-folded shape. The tube 46 provides communication between the blower 40 and the flow passage 80. The blower mechanism 42 is a small-diameter cylindrical member accommodated inside the blower 40. For example, a centrifugal mechanism may be used as the blower mechanism 42. The centrifugal mechanism is a mechanism that blows air in the centrifugal direction while sucking in the external air from the axial direction of the blower. Examples of the blower mechanism 42 include a multi-blade fan (sirocco fan), a plate fan, a turbo fan, an airfoil fan, and a limit load fan.

The first opening 44f is a through-hole formed, in the rear face of the blower 40, and air (external air) is supplied to the blower mechanism 42 through the first opening 44f. The second opening 44s is a through-hole formed in the peripheral face of the blower 40, and the air blown out of the blower mechanism 42 is discharged (supplied) to the outside of the blower 40 through the second opening 44s. The direction of the through-hole formed in the rear face of the blower 40 is "axial direction of the blower", and the direction of the through-hole formed in the peripheral face of the blower 40 is "centrifugal direction of the blower". Each base attachment portion 47 is a flat plate that protrudes outward in the radial direction of the blower 40, and has a screw hole (reference numeral thereof is omitted) into which the screw N1 is inserted. The base attachment portions 47 are arranged at the upper ends and lower ends of the side portions of the blower 40, which face the attachment portions 34. Further, each first attachment portion 48 is a flat plate that protrudes radially outward at an intermediate section of the side portion of the blower 40, and has a substantially V-shape in the front view.

Each first attachment portion 48 has a screw hole (reference numeral thereof is omitted) that passes through the first attachment portion 48 in the front-rear direction of the seatback 6, and a screw N2 is inserted in the screw hole.

The duct 50 is a tube that provides communication between the supply portion 70 and the blower 40, and has an accordion portion 52, a first introducing portion 54*f*, a second introducing portion 54*s*, and second attachment portions 58 (see FIGS. 2 and 3). The accordion portion 52 is an accordion-fold portion formed in an intermediate portion of the duct 50, and is bent flexibly. The first introducing portion 54*f* opens at a position facing the first opening 44*f* of the blower 40. The second introducing portion 54*s* opens at a position facing the supply portion 70. Each second attachment portion 58 is a flat plate that protrudes outward from the duct 50 to a position facing the corresponding first attachment portion 48. Each second attachment portion 58 has a screw hole (reference numeral thereof is omitted) that passes through the second attachment portion 58 in the front-rear direction of the seatback 6, and the screw N2 is inserted in the screw hole.

In the first embodiment, the blower 40 is disposed at and attached to the center of the upper portion of the support bracket 30, that is, the portion of the support bracket 30 above the communication holes 32 (see FIG. 2). At this time, the base attachment portions 47 and the support bracket 30 are fastened together by screwing the screws N1 into the screw holes of the base attachment portions 47 and the attachment portions 34 and tightening them. In this way, the blower 40 is attached to the support bracket 30. Then, the first attachment portions 48 and the second attachment portions 58 are aligned with each other and then screwed together with the screws N2. In this way, the duct 50 is attached to the blower 40. At this time, the first introducing portion 54*f* is communicated with the first opening 44*f*. In this way, the external air is supplied from the duct 50 to the blower 40, as will be described later.

Figure 5:
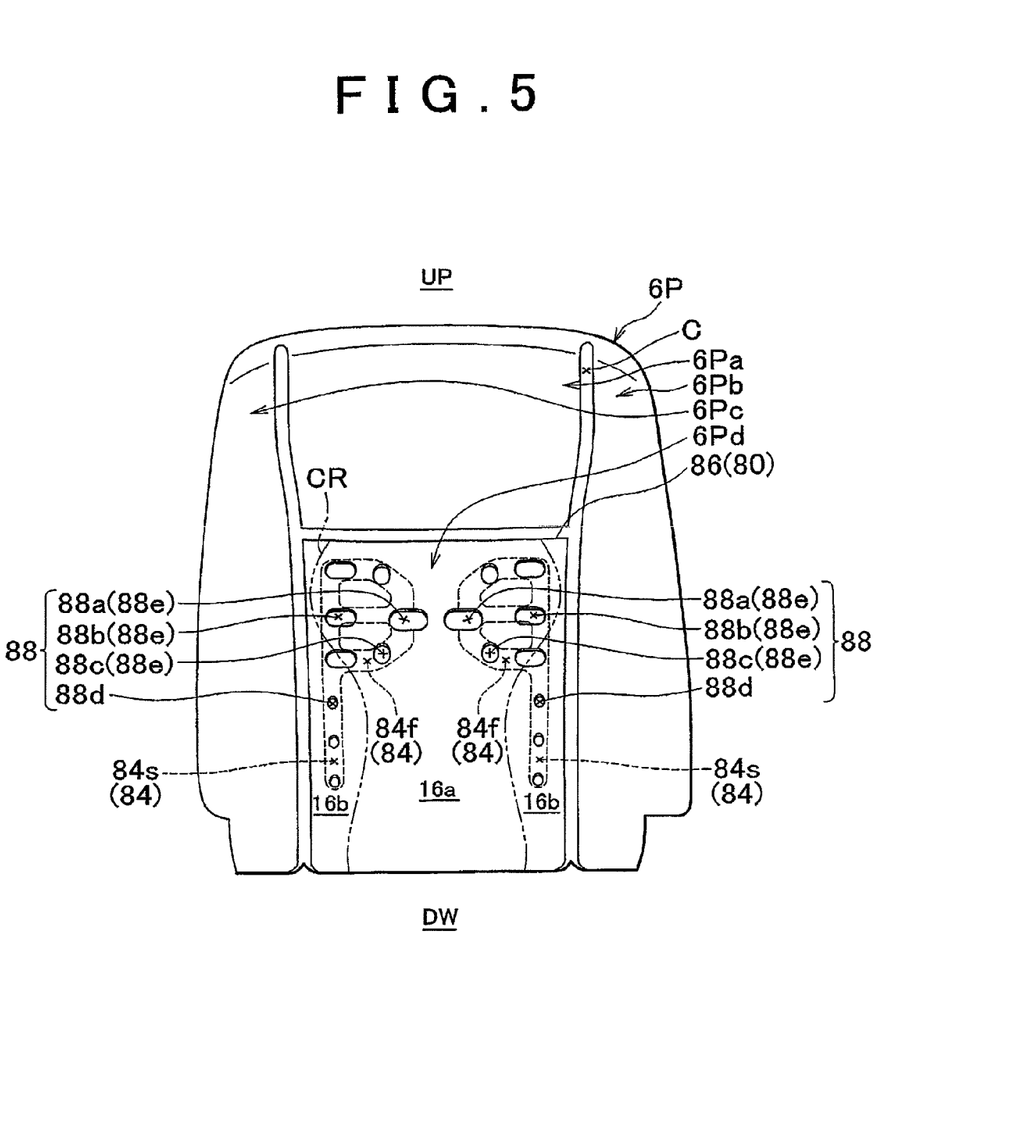
FIG. 5 is a perspective front view of the cushion member.

The cushion member 6P is a substantially rectangular member that defines the outer shape of the seatback 6, and has the flow passage 80 (see. FIGS. 3 to 5). A backing layer B, which is a resin protective layer, is formed on the rear face of the cushion member 6P. The material of the cushion member 6P is not particularly limited, but an elastic resin, for example, polyurethane foam may be employed. In the first embodiment, the seating-side portion of the cushion member 6P is divided into four sections, that is, a first top face 6Pa, a second top face 6Pd, and a pair of side faces 6Pb, 6Pc, by a groove C having a substantially H-shape in the front view. The side faces 6Pb, 6Pc form the respective side parts of the seatback 6. The first top face 6Pa is an upper portion of the seatback 6, and the second top face 6Pd is a lower portion of the seatback 6. In the first embodiment, when the seatback 6 is held upright, the first top face 6Pa occupies approximately one third of the seatback 6 from the top, and the second top face 6Pd occupies the remaining two-thirds of the seat back 6. The center portion 16*a* is formed at the center of the second top face 6Pd, and the side portions 16*b* are formed at the lower side portions of the second top face 6Pd.

The flow passage 80 guides the air blown out of the blower 40 toward the seating side, and has a pair of holes 82, a pair of communication portions 84, and a cover 86 (see FIGS. 3 and 4). The holes 82 are through-holes that pass through the cushion member 6P in its thickness direction, and formed at the center of the cushion member 6P. The center of the cushion member 6P faces the communication holes 32. Further, each communication portion 84 is a recess, that is, a groove, formed in the seating-side portion of the cushion member 6P, and has a first section 84*f* and a second section 84*s*. The first section 84*f* is formed of three portions which branch off from the hole 82, extend in the seatback-width direction from the hole 82, and communicate with the second section 84*s*. The second sections 84*s* extend in the up-down direction of the seatback 6, and are formed in the side portions 16*b* of the seatback 6.

Further, in the first embodiment, the holes 82 and the communication portions 84 are formed in the second top face 6Pd. For example, the holes 82 are formed at the center of the seatback 6, that is, at the center of the upper portion of the second top face 6Pd, and the communication portions 84 are formed so as to be symmetric with respect to the center line of the seatback 6 (see FIGS. 4 and 5). Each first section 84*f* is formed in a portion of the center portion 16*a*, which faces the occupant's back, and is arranged in the upper portion of the second top face 6Pd (see the portion defined by the two-dot chain lines CR in FIG. 4). Each second section 84*s* is formed so as to extend from another portion of the center portion 16*a*, which faces the occupant's shoulder, to a portion on the side of the occupant's lower back, that is, the side portion 16*b*. In this way, each second section 84*s* is formed in the side portion of the second top face 6Pd.

The cover 86 is a substantially rectangular flat plate in a front view, and has a plurality of vents 88 (88*a* to 88*d*). The material of the cover 86 is not particularly limited, but the same material as that of the cushion member 6P is typically employed. The vents 88 (88*a* to 88*d*) are through-holes that pass through the cover 86 in its thickness direction, and are arranged along the aforementioned communication portions 84. The configurations (the number of the holes and the hole dimensions) of the vents 88 are adjusted as needed based on the position of the seatback 6. Thus, the amount of air supplied from the center portion 16*a*, that is, the upper portion of the second top face 6Pd, is set to be larger than the amount of air supplied from the side portions 16*b*, that is, the lower side portions of the second top face 6Pd. In other words, a larger amount of air is supplied from the center portion 16*a*.

In the first embodiment, center vents 88*e* and the side vents 88*d* are formed as the vents 88. In FIGS. 4 and 5, the reference numerals are assigned only to some of the vents for the sake of convenience. The first vents 88*a*, the second vents 88*b*, and the third vents 88*c* constituting the center vents 88*e* are formed in the center portion 16*a*, and the side vents 88*d* are formed in the side portions 16*b*. Each first vent 88*a* having a substantially elliptical shape is a through-hole formed in a portion of the center portion 16*a*, and is formed along the first section 84*f*. Each second vent 88*b* having a substantially elliptical shape is a vent formed in another portion of the center portion 16*a*, and the second vents 88*b* are formed along the upper portion of the second section 84*s*. Each third vent 88*c* having a substantially circular shape is located between the occupant's back and the occupant's shoulder, and the third vents 88*c* are formed along the first section 84*f*. Each side vent 88*d* having a substantially circular shape is a through-hole formed in the side portion 16*b*, and the side vents 88*d* are formed along the lower portion of the second section 84*s*.

In the first embodiment, the number of the center vents 88*e* is larger than that of the side vents 88*d*. Further, the opening size of each center vent 88*e* is made larger than that of each side vent 88*d*. Alternatively, the total area of the center vents 88*e* may be made larger than the total area of the side vents 88*d*. In this way, the amount of air that is supplied from the center vents 88*e* of the center portion 16*a* is set larger than amount of air supplied from the side vents 88*d* of the side portions 16*b*. In the first embodiment, the opening size (opening area) of each second vent 88*b* may be made smaller than the opening size (opening area) of each first vent 88*a*. In this way, when the occupant's body is not in contact with the seatback 6, the amount of air supplied increases toward the center of the occupant's body.

In the first embodiment, the cover 86 is disposed on the seating side of the cushion member 6P to seal the communication portions 84 and the holes 82 (see FIGS. 3 to 5). The multiple vents 88 (88a to 88d) are arranged along the corresponding first sections 84f and second sections 84s of the communication portions 84. Next, the cushion member 6P is disposed on the seating side of the frame 6F. At this time, the cushion member 6P is disposed on the support bracket 30 with the holes 82 aligned with the respective communication holes 32. One end of the tube 46 is communicated with the second opening 44s, and the other end of the tube 46 is connected to the communication hole 32. As a result, the air blown out of the blower 40 passes through the holes 82 and the communication portions 84 (84f, 84s) and is supplied to the multiple vents 88 (88a to 88d).

The upholstery 6S is a saclike member that covers the cushion member 6P, and provided with the lower band 60 and the supply portion 70, that will be described later (see FIGS. 3 and 6). A pair of holes H1 into which the stays are inserted is formed in the upper portion of the upholstery 6S. The material of the upholstery 6S is not particularly limited, but any fabric having air permeability (woven fabric, knitted fabric, or nonwoven fabric) may be employed.

Figure 6:
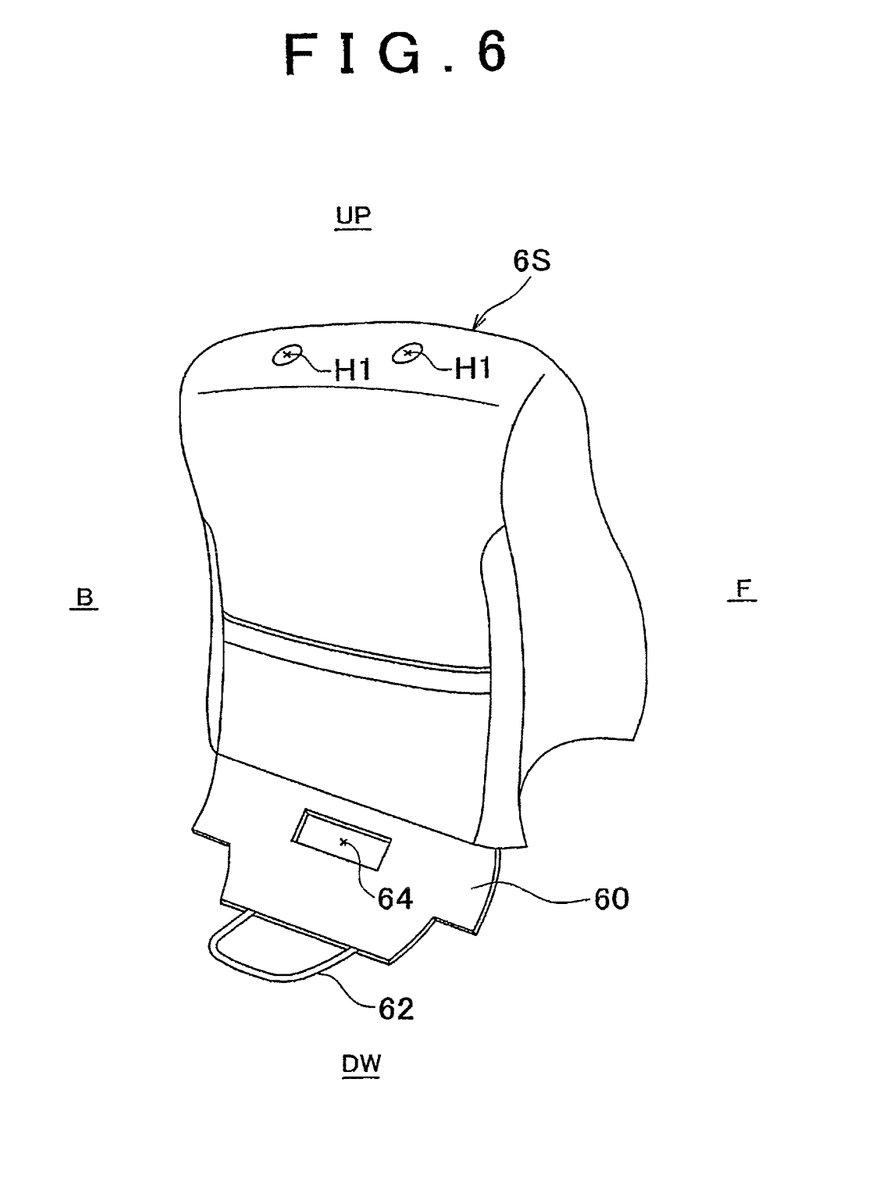
FIG. 6 is a perspective view of upholstery and a lower band.
Figure 7:
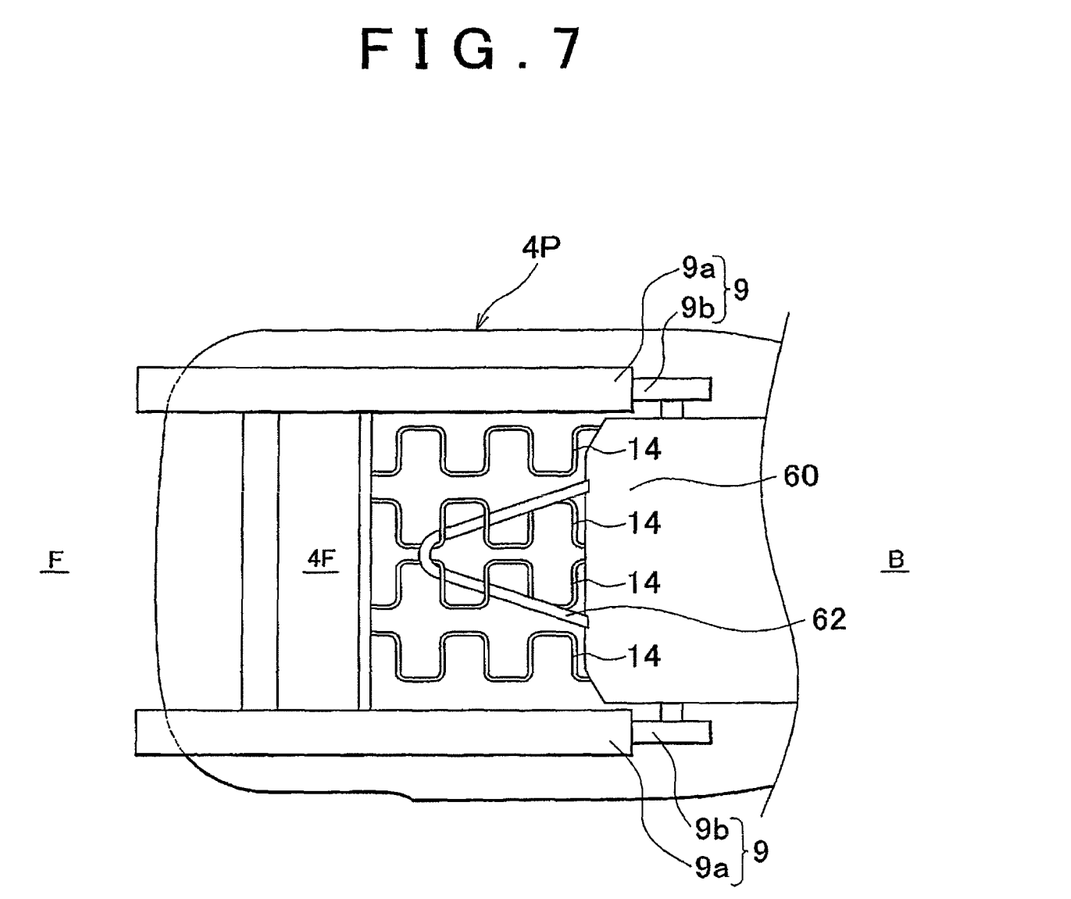
FIG. 7 is a rear view of part of a seat cushion.
Figure 8:
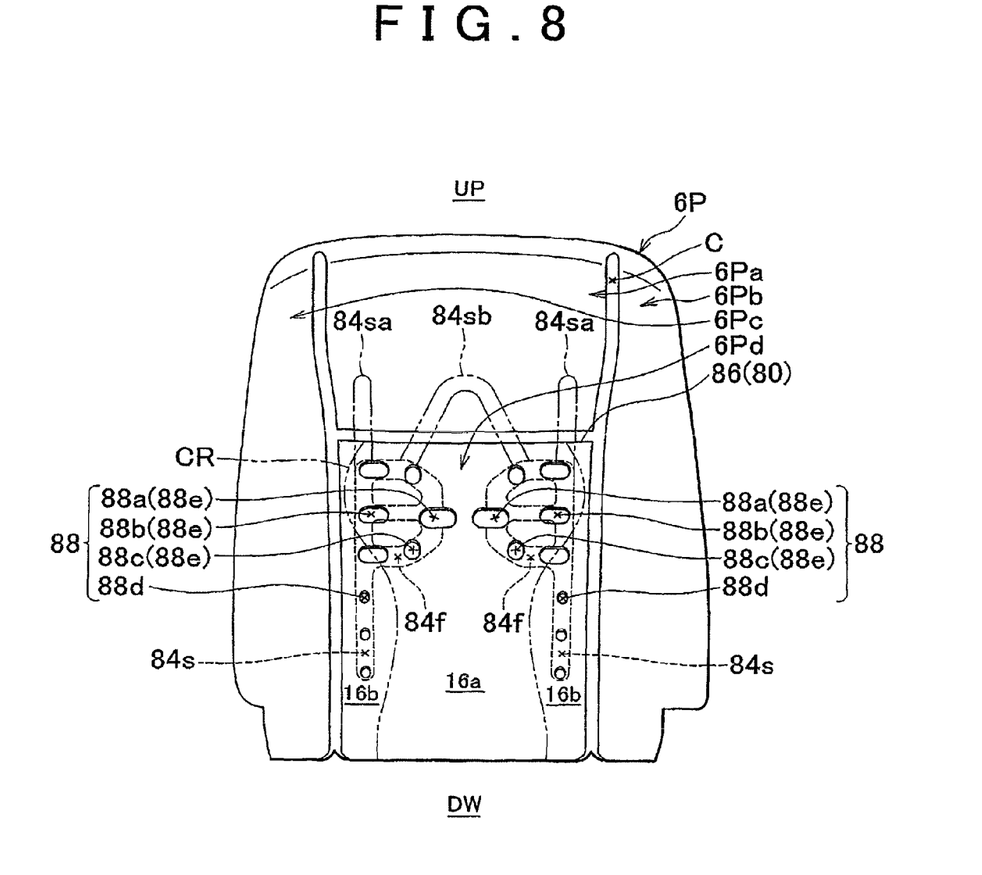
FIG. 8 is a perspective front view of a cushion member according to a second embodiment of the invention.

The lower band 60 is a sheet that covers a region where the seat cushion. 4 and the seatback 6 are coupled to each other, and has an engagement portion 62 and an attachment hole 64 (see FIGS. 3 and 6). The engagement portion 62 is a belt, and typically has elasticity. The attachment hole 64 is a substantially rectangular through-hole used to attach the supply portion 70 to the lower band 60. The attachment hole is formed at the center of the lower band 60. In the first embodiment, the engagement portion 62 is attached to one end of the lower band 60, and the other end of the lower band 60 is then sewn to the lower portion of the upholstery 6S. The material of the lower band 60 is not particularly limited, but material with a rigidity higher than that of the upholstery 6S is preferably employed. Fabric impregnated with resin, felt, and leather are examples of material of the lower band 60 of this type. If the lower band 60 has a high rigidity, the lower band 60 is prevented from losing its shape even if the occupant contacts the lower band 60 and the supply portion 70 is attached to the lower band 60 with stability.

The supply portion 70 supplies the external air to the blower 40, and has a first member 72f and a second member 72s (see FIG. 3). The material of the supply portion 70 is not particularly limited, but examples of suitable material include thermoplastic resins (polypropylene, polyvinyl chloride, and polyethylene) and thermosetting resins (phenolic resins, melamine resins, epoxy resins, and urea resins). If the supply portion 70 is formed of a flexible resin, the supply portion 70 is curved along the outer shape of the seatback 6. This gives the seatback 6 presentable appearance. An appropriate flexibility is given to the supply portion 70 if the supply portion 70 is made of rubber (natural rubber, synthetic rubber) or an elastomer.

The first member 72f is a flat plate having a substantially rectangular shape corresponding to the attachment hole 64, and has a first supply port 71, an engagement lug 74, and fitting lugs 76 (see FIGS. 3 and 6). The first supply port 71 has a plurality of through-holes H that extend in the longitudinal direction of the first member 72f, and a plurality of intermediate portions G that are arranged in a grid pattern to define the through-holes H. The engagement lug 74 is a protruding portion formed by bending the edge of the first member 72f (rear face). Each fitting lug 76 is a flat plate held upright relative to the rear face of the first member 72f. A plurality of return portions is formed at the distal end of the fitting lug 76. The return portions protrude toward the outside of the first supply port 71. In the first embodiment, the first supply port 71 is formed at the center of the first member 72f, and the multiple fitting lugs 76 are formed around the first supply port 71.

The second member 72s is a flat plate having a substantially rectangular shape corresponding to the first member 72f, and has a second supply port 72 and an upright portion 73. The second supply port 72 is a through-hole that extends in the longitudinal direction of the second member 72s, is arranged to be opposed to the through-holes H of the first supply port 71, and has such an opening size that all the fitting lugs 76 are inserted in the second supply port 72. The upright portion 73 is constituted of flat plates formed around the second supply port 72. A pad 56 is fitted to the upright portion 73. The pad 56 is a ring-shaped elastic member.

In the first embodiment, the supply portion 70 is inserted into the attachment hole 64 (see FIGS. 3 and 6). At this time, the first member 72f is disposed on the front face of the lower band 60, and the second member 72s is disposed on the rear face of the lower band 60. The front face of the lower band 60 is the face oriented toward the rear of the vehicle seat 2. The fitting lugs 76 are then engaged with the inner edge of the second member 72s, which defines the second supply port 72, while the engagement lug 74 is pressed against and engaged with the lower band 60. As a result, the supply portion 70 is fitted to the lower band 60. In the first embodiment, because the lower band 60 is a sheet member with a rigidity higher than that of the upholstery 6S, the resin supply portion 70 is attached to the lower band 60 with stability.

Further, the second introducing portion 54s of the duct 50 is communicated with the supply portion 70. In this way, the external air taken in from the supply portion 70 attached to the lower band 60 is supplied through the duct 50 to the blower 40. In this case, if the pad 56 is disposed around the upright portion 73 to be interposed between the duct 50 and the supply portion 70, the air leak between the duct 50 and the supply portion 70 is prevented or suppressed. In other words, the above-described configuration provides excellent seat performance. Instead of the pad 56, an accordion tube (not shown in the drawings) may be interposed between the duct 50 and the supply portion 70.

Then, the cushion member 6P and the blower 40 are covered with the upholstery 6S. After that, one end of the lower band 60 is drawn to the bottom of the seat cushion 4, and the engagement portion 62 is engaged with the frame 4F or the S-shaped springs 14 (see FIGS. 3 and 7). The region where the seatback 6 and the seat cushion 4 are coupled to each other is thus covered with the lower band 60, which gives the vehicle seat 2 presentable appearance. Further, because the lower band 60 is disposed below the seatback 6, the supply portion 70 is disposed at a relatively inconspicuous place.

As shown in FIGS. 3 to 5, while the external air is supplied to the blower 40, the air blown out of the blower 40 is supplied to the occupant through the flow passage 80. At this time, according to the first embodiment, the amount of air supplied from the center vents 88e of the center portion 16a is larger than the amount of air supplied from the side vents 88d of the side portions 16b when the occupant is not in contact with the seatback 6. On the other hand, when, for example, the occupant is leaning against the seatback 6 and the center vents 88e of the center portion 16a are thereby closed due to contact of the occupant with the center portion 16a, air is supplied from the side vents 88d of the side portions 16b. In other words, the amount of air supplied to the occupant is appropriately adjusted. Further, when only the occupant's back is in contact with the seatback 6 and the first vents 88a are thereby closed, the air is supplied from the second vents 88b, third vents 88c, and side vents 88d. According to the first embodiment described above, the air is supplied from either the center vents 88e or the side vents 88d, or supplied from both the center vents 88e and the side vents 88d, based on the manner in which the occupant is seated in the vehicle seat 2. Therefore, the multiple vents 88 (88a to 88d) in the first embodiment makes it possible to supply the air appropriately based on the manner in which the occupant is seated in the vehicle seat 2.

Hereafter, a second embodiment of the invention will be described. The second embodiment differs from the first embodiment only in the following features. In the second embodiment, at least one of side portions (lower portions on the sides of the occupant's lower back, upper portions on the sides of the occupant's shoulder portion, and portion facing the occupant's neck) is formed in the seatback 6 (see FIG. 8). Further, second sections (84s, 84sa, 84sb) are formed in the respective side portions. That is, the linear second sections 84s are formed in the lower portions on the sides of the occupant's lower back (both lower side portions of the second top face 6Pd) and communicated with the first sections 84f. Further, the linear second sections 84sa are formed in the upper portions on the sides of the occupant's shoulder portion (both upper side portions of the first top face 6Pa) and communicated with the first sections 84f. In addition, the second section 84sb having a substantially inverted V-shape is formed at the position facing the occupant's neck (center of the first top plane face 6Pa), and both end portions of the second section 84sb are communicated with the respective first sections 84f. At least one side vent 88d is formed in at least one section from among the plurality of side portions (84s, 84sa, 84sb). This makes it possible to supply the air appropriately based on the manner in which the occupant is seated in the vehicle seat 2.

The vehicle seat according to the invention is not limited to the above-described embodiments, and may be implemented in various other embodiments.

(1) In the above-described embodiments, the configuration according to the invention is applied to the seatback 6. However, the configuration according to the invention may also be applied to seat components such as the seat cushion 4. For example, in the case where the configuration of the invention is applied to the seat cushion 4, the portion that contacts the occupant's buttocks and legs is at the center portion, and the portions on the sides of the occupant's buttocks or the occupant's legs are the side portions. In the cushion member of the seat cushion 4, the part constituting the seating portion may be divided into multiple (e.g. two or three) sections by a groove. In this case, the flow passage may be formed in the rear portion of the top face of the seat cushion 4.

(2) In the above-described embodiments, the center vents 88e and side vents 88d are described as the multiple vents 88. However, the description concerning the vents 88 does not limit the configurations of vents (number of hole's, opening size, shape, etc.). For example, as the center vents, at least one of the first vents, second vents and third vents may be formed in the cushion member. The vents may be formed into various shapes, such as circular, elliptical, and triangular shapes. The number of the first vents, the number of the second vents and the number of the third vents may each be one, or two or more.

(3) In the above-described embodiments, communication between the blower 40 and the supply portion 70 is provided by the duct 50, but the duct 50 may be omitted.

(4) In the above-described embodiments, an example of the configuration of the lower band 60 is described, but this configuration does not limit the configuration of the lower band. For example, an engagement portion may be attached to the other end of the lower band, and one end of the lower band may be sewn to the rear portion of the upholstery of the seat cushion 4. In this case, the engagement portion is engaged to the frame of the seatback 6. A J-shaped hook may be used as the engagement portion.

(5) In the above-described embodiments, an example of the configuration of the supply portion 70 is described, but this configuration does not limit the configuration of the supply portion. The supply portion 70 may be formed in various shapes, such as circular, elliptical, and triangular shapes in the front view. A single supply portion or a plurality of supply portions may be provided.

(6) In the above-described embodiments, the supply portion 70 is provided at the lower portion of the seatback 6, but this configuration does nOt limit the position at which the supply portion is arranged. The supply portion may be disposed at the rear portion of the seat cushion or between the seat cushion and the seatback.

What is claimed is:

1. A vehicle seat, comprising:
a seat component that includes a cushion member which defines an outer shape of the seat component, and
a blower that is provided in the seat component,
wherein air blown out of the blower is supplied to a seating-face of the seat component through a flow passage defined in the cushion member,
the seat component has a center portion that is configured to contact a body part of a seated occupant, and side portions that are configured not to contact the body part of the seated occupant,
the flow passage has a center vent provided at the center portion of the seat component, a side vent provided at at least one of the side portions of the seat component, and a communication portion that provides communication between the center vent and the side vent within the seat component,
the air blown out of the blower is supplied through the communication portion to the seating-face from at least one of the center vent and the side vent, and
when the center portion of the seat component contacts the body part of the occupant, an amount of air supplied from the center vent is smaller than an amount of air supplied from the side vent.

2. The vehicle seat according to claim 1, wherein
when the body part of the occupant is not in contact with the center portion of the seat component, an amount of air supplied from the center vent is larger than an amount of air supplied from the side vent.

3. The vehicle seat according to claim 1, wherein
the center vent comprises a plurality of center vents and the side vent comprises a plurality of side vents, and
a number of the plurality of center vents is larger than a number of the plurality of side vents.

4. The vehicle seat according to claim 1, wherein
the center vent comprises a plurality of center vents and the side vent comprises a plurality of side vents, and
a total area of the plurality of center vents is larger than a total area of the plurality of side vents.

5. The vehicle seat according to claim 1, wherein
the center vent comprises a first vent and a second vent provided at a position closer to a side edge of the seat component than the first vent, and an opening area of the second vent is smaller than an opening area of the first vent.

* * * * *